United States Patent
Que

(10) Patent No.: US 8,651,689 B2
(45) Date of Patent: Feb. 18, 2014

(54) LIGHT EMITTING DIODE LIGHT BAR STRUCTURE HAVING HEAT DISSIPATION FUNCTION

(75) Inventor: Chengwen Que, Shenzhen (CN)

(73) Assignee: Shenzhen China Star Optoelectronics Technology Co., Ltd, Shenzhen (CN)

( * ) Notice: Subject to any disclaimer, the term of this patent is extended or adjusted under 35 U.S.C. 154(b) by 305 days.

(21) Appl. No.: 13/000,179

(22) PCT Filed: Nov. 17, 2010

(86) PCT No.: PCT/CN2010/078812
§ 371 (c)(1),
(2), (4) Date: Dec. 20, 2010

(87) PCT Pub. No.: WO2012/037746
PCT Pub. Date: Mar. 29, 2012

(65) Prior Publication Data
US 2012/0069569 A1    Mar. 22, 2012

(30) Foreign Application Priority Data

Sep. 20, 2010    (CN) .......................... 2010 1 0293678

(51) Int. Cl.
| F21V 21/00 | (2006.01) |
| F21S 4/00 | (2006.01) |
| H01R 33/00 | (2006.01) |
| F21V 29/00 | (2006.01) |

(52) U.S. Cl.
USPC .................. 362/217.1; 362/249.13; 362/646; 362/294

(58) Field of Classification Search
USPC .................. 362/294, 373, 249.02–249.04, 362/217.01–217.17, 645–647
See application file for complete search history.

(56) References Cited

U.S. PATENT DOCUMENTS

| 5,436,809 A * | 7/1995 | Brassier et al. ............... 362/545 |
| 6,428,189 B1 * | 8/2002 | Hochstein ..................... 362/373 |
| 6,866,394 B1 * | 3/2005 | Hutchins et al. .............. 362/192 |
| 6,999,318 B2 * | 2/2006 | Newby .......................... 361/719 |
| 7,360,923 B2 * | 4/2008 | Weber-Rabsilber et al. . 362/241 |
| 7,677,899 B2 * | 3/2010 | Low ................................ 439/56 |
| 2005/0105296 A1 * | 5/2005 | French .......................... 362/485 |

(Continued)

FOREIGN PATENT DOCUMENTS

| CN | 2859190 Y | 1/2007 |
| CN | 101421556 A | 4/2009 |
| TW | 200925493 A | 6/2009 |

*Primary Examiner* — Jong-Suk (James) Lee
*Assistant Examiner* — Bryon T Gyllstrom
(74) *Attorney, Agent, or Firm* — Ditthavong Mori & Steiner, P.C.

(57) ABSTRACT

The present invention discloses a light emitting diode (LED) light bar structure having heat dissipation function, adapted for a backlight module, and including a heat dissipation body, a plurality of light emitting diodes (LEDs), and a circuit board. The heat dissipation body has a circuit board insertion slot and is provided with a plurality of installation holes in row. The installation holes pass through the heat dissipation body, the LEDs are embedded in respective installation holes, and the circuit board is received in the circuit board insertion slot whereby the LEDs are fixed in the installations holes and electrically connect the circuit board. Accordingly, the LED light bar structure not only simplifies assembling procedures but also directly and laterally dissipate heat generated by the LEDs through a tight engagement of the LEDs and the heat dissipation body, thereby improving dissipation efficiency of the backlight module.

4 Claims, 4 Drawing Sheets

(56) References Cited

U.S. PATENT DOCUMENTS

| | | | |
|---|---|---|---|
| 2006/0087851 A1* | 4/2006 | Dubord | 362/362 |
| 2006/0187660 A1* | 8/2006 | Liu | 362/294 |
| 2007/0121326 A1* | 5/2007 | Nall et al. | 362/294 |
| 2007/0285930 A1* | 12/2007 | Chen | 362/373 |
| 2008/0093614 A1* | 4/2008 | Nagai | 257/98 |
| 2008/0239716 A1* | 10/2008 | Lin | 362/219 |
| 2008/0298058 A1* | 12/2008 | Kan et al. | 362/240 |
| 2009/0066877 A1* | 3/2009 | Abe et al. | 349/62 |
| 2009/0086478 A1* | 4/2009 | Sanroma et al. | 362/234 |
| 2009/0185374 A1* | 7/2009 | Wu et al. | 362/249.06 |
| 2009/0207609 A1* | 8/2009 | Higley et al. | 362/235 |
| 2009/0213583 A1* | 8/2009 | Chang et al. | 362/218 |
| 2009/0244909 A1* | 10/2009 | Chen | 362/368 |

* cited by examiner

LIGHT EMITTING DIODE LIGHT BAR STRUCTURE HAVING HEAT DISSIPATION FUNCTION

BACKGROUND OF THE INVENTION

1. Field of the Invention

The present invention relates to a light emitting diode light bar structure, and particularly to a light emitting diode light bar structure having heat dissipation function.

2. Related Art

Liquid crystal display (LCD) panels are now widely used in electronic products which have growing potential such as monitors, notebooks, digital cameras, projectors, and so on. After producing a glass base, LCD panel manufacturers firstly assemble and package up the glass base with color filters, then fill liquid crystals therein, and further assemble with a backlight module, driving integrated circuits (IC), and control circuit boards, etc., to cooperatively produce a LCD module so as to sell it to downstream manufactures of notebooks or LCD monitors.

The backlight module is one of key components of the LCD panel. Because liquid crystals do not emit light directly themselves, the function of the backlight module is to provide sufficient brightness and uniform emitting light source in order to normally display images. The backlight module is mainly assembled with components including light sources, lamp covers, reflector sheets, light guide plates, diffuser sheets, brightness enhancement films and frames, etc.

Generally speaking, backlight modules have been developed based on size requirements into a type of edge lighting structures and another type of bottom lighting structures, which are categorized by locations of lamp tubes thereof. Wherein, a light source of the type of edge lighting structures is a single light source placed aside, and a light source of the type of bottom lighting structures is placed right beneath. The lamp tubes of the backlight modules must be featured with high brightness and a long lifespan, etc. They currently include cold cathode fluorescent lamps (CCFL), hot cathode fluorescent lamps, light emitting diodes (LED) and electroluminescence (EL), etc.

Among them, the CCFL has characters of high luminance, high efficiency, a long lifespan, and high color rendering, etc. Besides, it is much easier to be assembled with light reflection components to form a thin-sheet lighting device due to its cylinder shape. Therefore, using the CCFL as main backlight sources was once a main trend for making backlight modules. However, the CCFL is gradually eliminated by the present trend of soaring environmental awareness today due to its filled content of mercury vapors. Since using LED as backlight sources has an advantage of energy saving and environmental protection over the CCFL, it becomes a trend in backlight development to replace the CCFL by the LED. A lighting structure of the LED is generally called as a light bar in practice.

Referring to FIG. 1, FIG. 1 is a perspective view showing a structure of a currently existing LED light bar. As shown in FIG. 1, a LED light bar structure 90 includes a circuit board 91 of a substantially long strap shape and a plurality of LEDs 92. The plurality of LEDs 92 are arranged on an upper surface of the circuit board 91 and fixed thereon through a plurality of solder points 93 to be electrically connected with the circuit board 91. The LED light bar structure 90 is capable of simulating lighting effect of the CCFL light source adopted by conventional backlight modules. For either edge lighting backlight module structures or bottom lighting backlight module structures, the LED light bar 90 can be installed directly to an original location of the CCFL to replace illumination of the CCFL. Although using LEDs as the backlight source has advantages of lightness and thinness, environmental protection, electricity saving, and so on, the aforementioned existing LED light bar still has a few problems:

(1) LEDs have much complicated processing technology. Currently, LEDs are fixed onto printed circuit boards (PCBs) through soldering, and therefore its processing is much complex.

(2) Heat dissipation of LED light bar is much difficult. Since it is not easy to perform natural convection inside backlight modules, generated heat of LEDs can only be dissipated indirectly through conduction of the circuit board 91. As a result, LED light bars usually have such problem of difficult heat dissipation.

SUMMARY OF THE INVENTION

It is imperative to provide a light emitting diode (LED) light bar structure having heat dissipation function with a view to solving the existing problems facing the prior art.

To achieve the above mentioned objective, the present invention is to provide a light emitting diode (LED) light bar structure having heat dissipation function, adapted for a backlight module, characterized in that the LED light bar structure comprises: a heat dissipation body having a first surface and a second surface opposite to the first surface, the first surface provided with a plurality of installation holes in row, the second surface protruding inwards to form a circuit board insertion slot, the circuit board insertion slot being shaped as a drawer-like slot, the installation holes passing through the first surface to the circuit board insertion slot; a plurality of light emitting diodes (LEDs) each having a top and a bottom and being embedded in a respective installation hole, the top facing the first surface of the heat dissipation body, the bottom facing the circuit board insertion slot of the heat dissipation body and having a plurality of first contact points thereon, at least one portion of peripheral surfaces of each of the LEDs being an inclined face, walls of the installation holes corresponding to the inclined faces of the LEDs to be oblique; a circuit board received in the circuit board insertion slot, a plurality of second contact points disposed on an upper face of the circuit board and corresponding to the first contact points of the LEDs whereby the second contact points electrically connect respective first contact points, the circuit board being received in the circuit board insertion slot in a transverse direction of the heat dissipation body; wherein the peripheral surfaces of the LEDs are tightly fitted to the installation holes of the heat dissipation body so that heat generated by the LEDs is directly and laterally dissipated by the heat dissipation body.

In an embodiment of the present invention, the plurality of first contact points of the LEDs are resilient electrically conductive structures.

In an embodiment of the present invention, the plurality of first contact points of the LEDs are resilient metal sheets.

In an embodiment of the present invention, the heat dissipation body is a heat dissipation frame bar made of a material of good thermal conductivity and mechanical strength.

In an embodiment of the present invention, the heat dissipation body is a heat dissipation frame bar made of metal or alloy.

To achieve the above mentioned objective, the present invention is to provide a light emitting diode (LED) light bar structure having heat dissipation function, adapted for a backlight module, the LED light bar structure comprising: a heat dissipation body being of a substantial long strap shape and having a first surface and a second surface opposite to the first surface, the first surface provided with a plurality of installation holes in row, the second surface protruding inwards to form a circuit board insertion slot, the installation holes passing through the first surface to the circuit board insertion slot; a plurality of light emitting diodes (LEDs) each having a top and a bottom and being embedded in a respective installation hole, the top facing the first surface of the heat dissipation body, the bottom facing the circuit board insertion slot of the heat dissipation body and having a plurality of first contact points thereon; a circuit board received in the circuit board insertion slot, a plurality of second contact points disposed on an upper face of the circuit board and corresponding to the first contact points of the LEDs whereby the second contact points electrically connect respective first contact points; wherein peripheral surfaces of the LEDs are tightly fitted to the installation holes of the heat dissipation body so that heat generated by the LEDs is directly and laterally dissipated by the heat dissipation body.

In an embodiment of the present invention, at least one portion of the peripheral surfaces of each of the LEDs is an inclined face, and walls of the installation holes correspond to the inclined faces of the LEDs to be oblique.

In an embodiment of the present invention, the plurality of first contact points of the LEDs are resilient electrically conductive structures.

In an embodiment of the present invention, the plurality of first contact points of the LEDs are resilient metal sheets.

In an embodiment of the present invention, the circuit board insertion slot is shaped as a drawer-like slot, and the circuit board is received in the circuit board insertion slot in a transverse direction of the heat dissipation body.

In an embodiment of the present invention, the circuit board is mounted onto the circuit board insertion slot by a plurality of screwing elements.

In an embodiment of the present invention, the heat dissipation body is a heat dissipation frame bar made of a material of good thermal conductivity and mechanical strength.

In an embodiment of the present invention, the heat dissipation body is a heat dissipation frame bar made of metal or alloy.

To achieve the above mentioned objective, the present invention is to provide a light emitting diode (LED) light bar structure having heat dissipation function, the LED light bar structure comprising: a heat dissipation body being of a substantial long strap shape and having a first surface and a second surface opposite to the first surface, the first surface provided with a plurality of installation holes in row, the installation holes passing through the first surface to the second surface; a plurality of light emitting diodes (LEDs) each having a top and a bottom and being embedded in a respective installation hole, the top facing the first surface of the heat dissipation body, the bottom facing the second surface of the heat dissipation body and having a plurality of first contact points thereon; a circuit board being mounted on the second surface of the heat dissipation body, a plurality of second contact points disposed on an upper face of the circuit board and corresponding to the first contact points of the LEDs whereby the second contact points electrically connect respective first contact points; wherein peripheral surfaces of the LEDs are tightly fitted to the installation holes of the heat dissipation body so that heat generated by the plurality of LEDs is directly and laterally dissipated by the heat dissipation body.

In an embodiment of the present invention, at least one portion of the peripheral surfaces of each of the LEDs is an inclined face, and walls of the installation holes correspond to the inclined faces of the LEDs to be oblique.

In an embodiment of the present invention, the plurality of first contact points of the LEDs are resilient electrically conductive structures.

In an embodiment of the present invention, the heat dissipation body is a heat dissipation frame bar made of metal or alloy, and the plurality of first contact points of the LEDs are resilient metal sheets.

In an embodiment of the present invention, the circuit board is mounted onto the second surface of the heat dissipation body with a plurality of screwing elements.

In an embodiment of the present invention, the heat dissipation body is a heat dissipation frame bar made of a material of good thermal conductivity and mechanical strength.

In an embodiment of the present invention, the heat dissipation body is a heat dissipation frame bar made of metal or alloy.

The LED light bar structure not only simplifies assembling procedures but also directly and laterally dissipate heat generated by the LEDs through a tight engagement of the LEDs and the heat dissipation body, thereby improving dissipation efficiency of the backlight module.

DESCRIPTION OF THE PREFERRED EMBODIMENTS

To render the aforesaid objectives, features, and advantages of the present invention more obvious and comprehensible, the present invention is hereunder illustrated with preferred embodiments in conjunction with the accompanying drawings as below.

The light emitting diode (LED) light bar structure of the present invention is adapted for backlight modules, which are not limited to any specific type, and can be either edge lighting structures or bottom lighting structures. Descriptions of an LED light bar structure used in backlight modules can be referred to the related depictions in the preceding background paragraphs, and will not be repeatedly stated herein.

Figure 1:
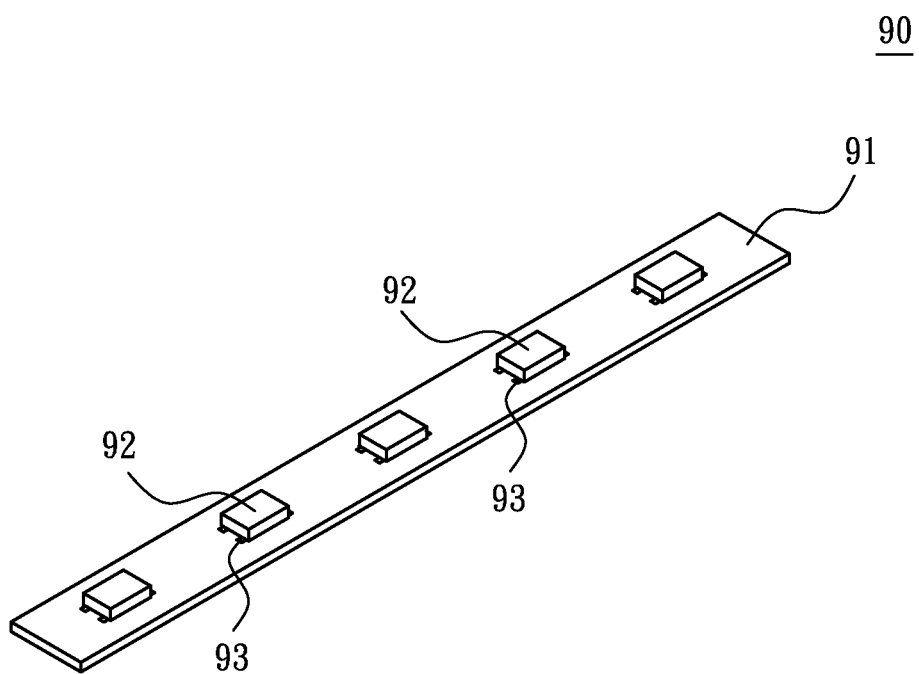
FIG. 1 is a perspective view of a conventionally existing light emitting diode light bar structure.
Figure 2:
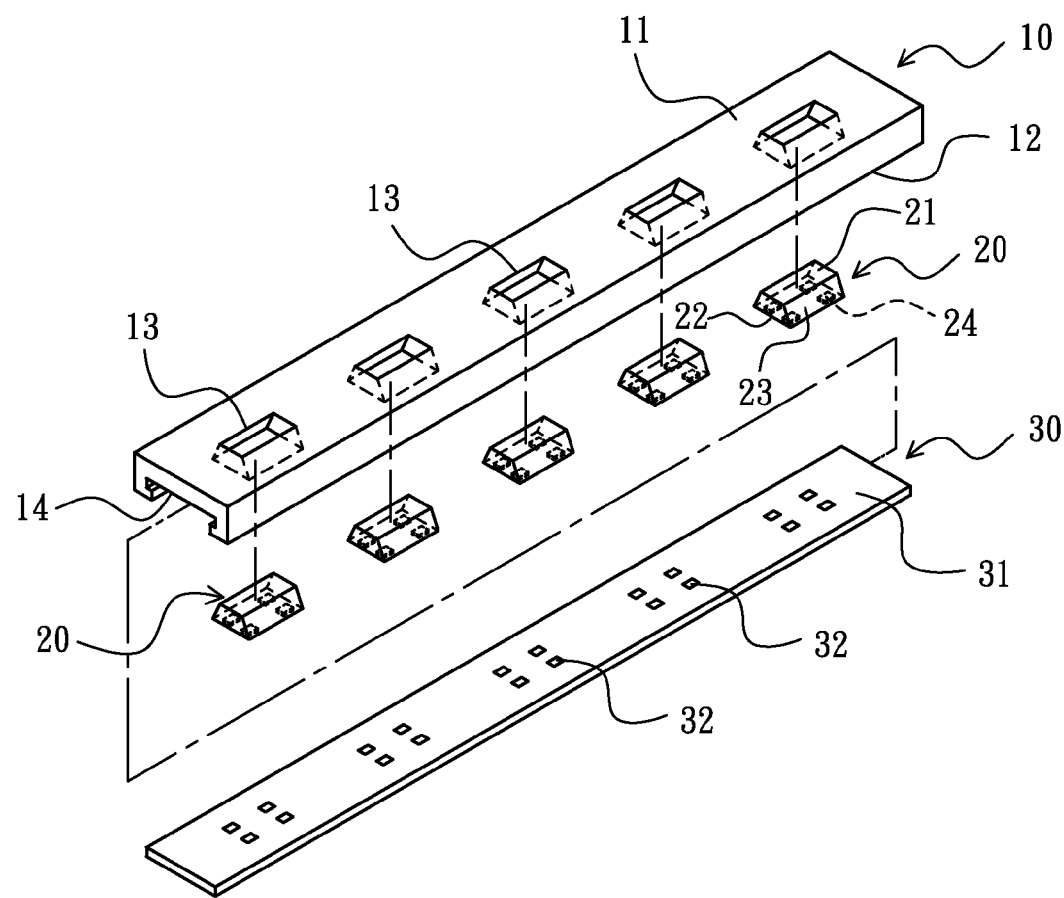
FIG. 2 is an exploded perspective view of a light emitting diode (LED) light bar structure having heat dissipation function according to a preferred embodiment of the present invention.
Figure 3:
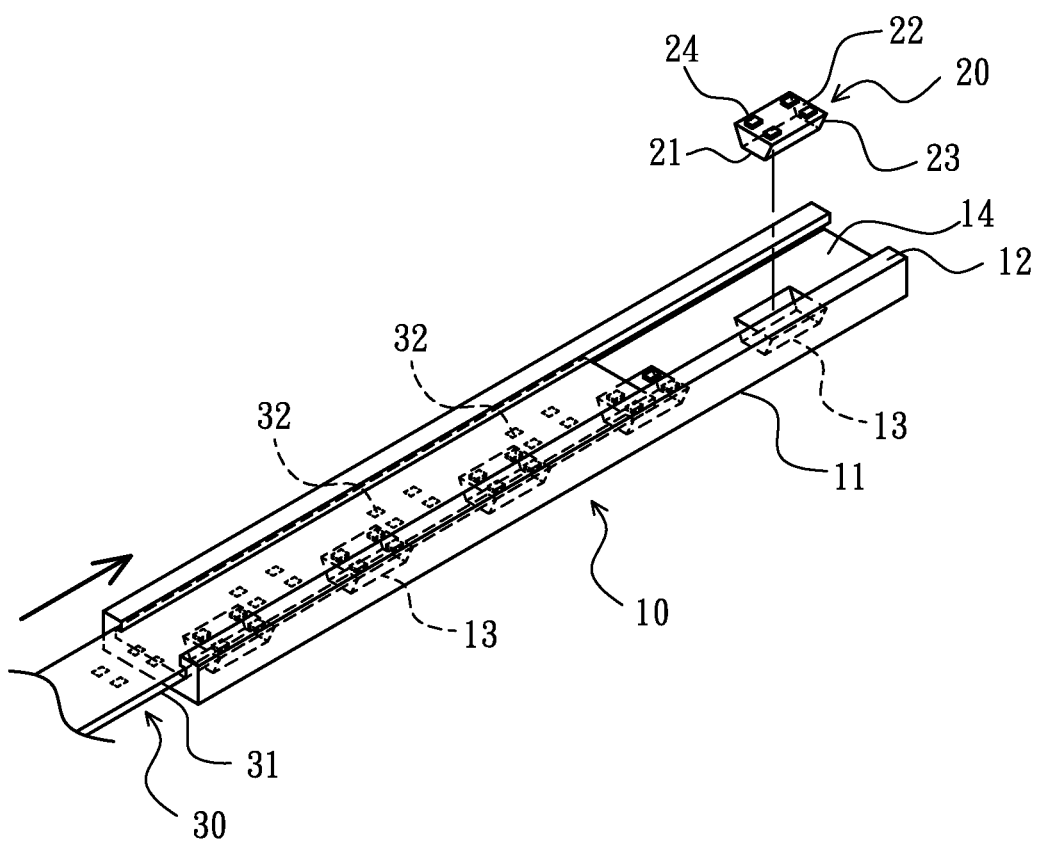
FIG. 3 is a schematic assembled perspective view of the LED light bar structure having heat dissipation function according to the preferred embodiment of the present invention.

Referring to both of FIG. 2 and FIG. 3, FIG. 2 is an exploded perspective view of a light emitting diode (LED) light bar structure having heat dissipation function according to a preferred embodiment of the present invention, and FIG. 3 is a schematic assembled perspective view of the LED light bar structure having heat dissipation function according to the preferred embodiment of the present invention from a different viewing angle. As shown in FIG. 2 and FIG. 3, the LED light bar structure 1 comprises a heat dissipation body 10, a plurality of light emitting diodes (LEDs) 20, and a circuit board 30. The heat dissipation body 10 is of a substantial long strap shape and comprises a first surface 11 and a second surface 12 opposite to each other. A plurality of installation holes 13 are disposed in rows on the first surface 11, and a circuit board insertion slot 14 is formed on the second surface 12. The plurality of installation holes 13 pass through the first surface 11 to the circuit board insertion slot 14.

In addition, as shown in FIGS. 2 and 3, each of the plurality of LEDs 20 comprises a top 21 and a bottom 22, and is embedded in a corresponding installation hole 13. The top 21 faces the first surface 11 of the heat dissipation body 10, and the bottom 22 faces the circuit board insertion slot 14 of the heat dissipation body 10 and comprises a plurality of first contact points 24 disposed thereon. Light from the LEDs 20 is emitted outward through the top 21. The bottom 22 can be either a circuit base or a lead-frame of the LED 20.

Furthermore, as shown in FIGS. 2 and 3, the circuit board insertion slot 14 of the heat dissipation body 10 is shaped as a drawer-like slot, which forms as a substantial "T" slot shape in cross section. The drawer-like slot 14 has two rabbets formed on two opposite side walls thereof, and at least one of the other two side walls is an open type which exposes the rabbets in a lateral direction of the heat dissipation body 10. The circuit board 30 is engaged into the circuit board insertion slot 14 via transversal sliding to be positioned therein. If necessary, the circuit board 30 can be fixed to the heat dissipation body 10 by plural screws (not shown) so as to enhance strength of the heat dissipation body 10. A plurality of second contact points 32 are disposed on an upper face 31 of the circuit board 30 and correspond to the plurality of first contact points 24 of the LEDs 20. The plurality of second contact points 32 electrically connect respectively with the plurality of first contact points 24 when the circuit board 30 is engaged and positioned therein.

Figure 4:
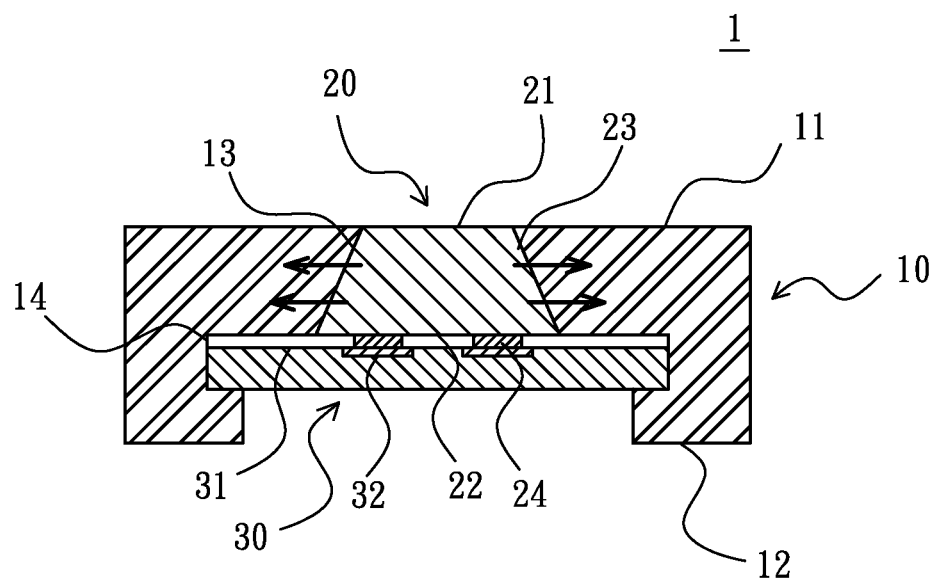
FIG. 4 is a sectional view of the LED light bar structure having heat dissipation function according to the preferred embodiment of the present invention.

Referring to FIG. 4, FIG. 4 is a sectional view of the LED light bar structure having heat dissipation function according to the preferred embodiment of the present invention. As shown in FIG. 4, peripheral surfaces 23 of the plurality of LEDs 20 are inclined, and walls of the installation holes 13 corresponding to the peripheral surfaces 23 of the plurality of LED 20 are oblique as well. In this preferred embodiment, each of the plurality of LEDs 20 is of a substantial quadrilateral-frustum shape, that is, the peripheral surfaces 23 of the LED 20 are divided into two sets (one of which is located longitudinally, the other one is located transversally), wherein at least one set of the peripheral surfaces 23 is inclined inwards of the top 21. Likewise, internal diameters of the installation hole 13 increase from the first surface 11 to the second surface 12. Accordingly, the plurality of LEDs 20 are embedded into respective installation holes 13 in a direction from the circuit board insertion slot 14 of the second surface 12 of the heat dissipation body 10 in order to ensure a fit engagement with the installation holes 13.

Figure 5:
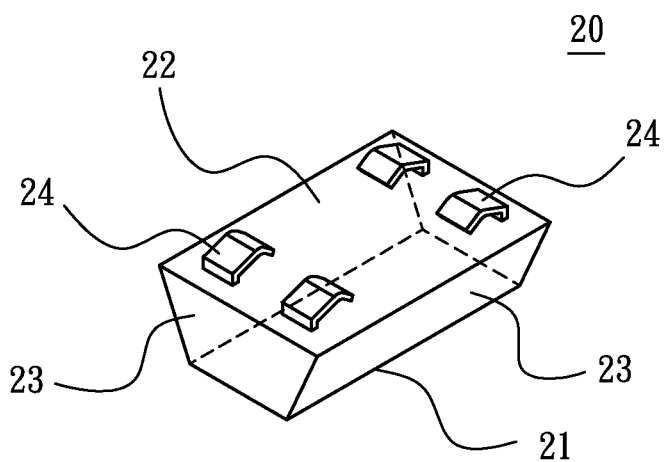
FIG. 5 is a perspective view of a light emitting diode according to the preferred embodiment of the present invention.

Referring to FIG. 5, FIG. 5 is a perspective view of the LED 20 of the preferred embodiment of the present invention. As shown in FIG. 5, the plurality of first contact points 24 of the LEDs 20 are preferably resilient electrically conductive structures, such as resilient metal sheets. The first contact points 24 of the resilient metal sheets generate a resilient restoring force when resiliently pressed by respective second contact points 32 of the circuit board 30 so that to ensure a perfectly electrically contact between the first contact points 24 of the LEDs 20 and the second contact points 32 of the circuit board 30. However, types of the resilient metal sheets are not specifically defined by the present invention.

Accordingly, in assembly, firstly the LEDs 20 are embedded in the installation holes 13 of the heat dissipation body 10, and then the circuit board 30 is received in the circuit board insertion slot 14 in a transverse direction of the heat dissipation body 10, whereby procedures of assembling the LED light bar structure 1 are significantly simplified and existing processing of welding LEDs to a circuit board are omitted as well. Furthermore, through a tight and fit contact between the peripheral surfaces 23 of the LEDs 23 and the installation holes 13 of the heat dissipation body 10, heat generated by the LEDs 20 is directly and laterally dissipated by the heat dissipation body 10 (directions of dissipating directions shown as arrows in FIG. 4), whereby to improve heat dissipation efficiency of the whole backlight module (not shown).

Moreover, although in the preferred embodiment of the present invention the LEDs 20 are of a quadrilateral-frustum shape having one set of the peripheral surfaces thereof being inclined and opposite to each other (as shown in FIG. 4), and shape of the installation holes 14 correspond to that of the LEDs 20, a specific shape of the LEDs 20 is not restricted. The shape of the LEDs 20 can be polygonal or cylindrical or of step-like peripheral surfaces. It is also not restricted by the present invention for how many of the peripheral surfaces 23 of the LEDs 20 are to be inclined. That at least one portion of the peripheral surfaces 23 of the LEDs 20 is inclined is capable of positioning the LEDs 20 and increasing contact area between the LEDs 20 and the heat dissipation body 10. Besides, the heat dissipation body 10 is preferably made of a material of good thermal conductivity and mechanical strength. For instance, the heat dissipation body 10 is a heat dissipation frame bar made of metal or alloy, and particularly a heat dissipation frame bar formed by aluminum extrusion. Moreover, the heat dissipation body 10 is additionally formed with a long slit of a shallow depth in order to laterally communicate with all of the installation holes 13, thereby to reduce processing work for drilling the installation holes 13 after the aluminum extrusion.

Still further, as shown in FIGS. 2 and 3, the circuit board insertion slot 14 of the heat dissipation body 10 is shaped as a drawer-like slot, and the circuit board 30 is received in the circuit board insertion slot 14 in a transverse direction of the heat dissipation body 10, whereby both the LEDs 20 and the circuit board 30 are positioned. However, methods to install the circuit board 30 to the circuit board insertion slot 14 are not restricted by the present invention, and the circuit board 30 can be received in the circuit board insertion slot 14 in different ways other than mentioned above. Alternatively, the heat dissipation body 10 is not provided with the circuit board insertion slot 14, the installation holes 13 pass through the first surface 11 to the second surface 12 of the heat dissipation body 10, and the circuit board 30 is able to be mounted on the second surface 12 of the heat dissipation body 10 with, such as, screwing elements (not shown).

Accordingly, in comparison, an existing LED light bar involves intricate processing and is inefficient in heat dissipating. The LEDs 20 of the present invention are embedded in the respective installation holes 13 of the heat dissipation body 10, and then the circuit board 30 is received in the circuit board insertion slot 14 of the heat dissipation body 10 in order to position and electrically connect the LEDs 20, and the processing of the LED light bar structure 1 is therefore simplified. Furthermore, through a tight and fit contact between the peripheral surfaces 23 of the LEDs 23 and the installation holes 13, heat generated by the LEDs 20 is directly and laterally dissipated by the heat dissipation body 10, whereby heat dissipation efficiency of the whole backlight module (not shown) is improved.

The present invention has been illustrated and described in detail by the preferred embodiments thereof, while the above mentioned embodiments of the present invention are described only for an illustrative purpose. It is required to point out that the present invention should not be limited to the disclosed embodiments as illustrated, and that all modifications and alterations which maintain the spirit and realm of the present invention are within the scope as defined in the appended claims

What is claimed is:

1. A light emitting diode (LED) light bar structure having heat dissipation function, adapted for a backlight module, characterized in that: the LED light bar structure comprises:
    a heat dissipation body having a first surface and a second surface opposite to the first surface, the first surface provided with a plurality of installation holes in row, the second surface protruding inwards to form a circuit board insertion slot, the circuit board insertion slot being shaped as a drawer-like slot, the drawer-like slot further comprising two rabbets which are formed on two opposite side walls of the circuit board insertion slot, at least one of the other two side walls being an open type which exposes the rabbets in a lateral direction of the heat dissipation body, said installation holes passing through the first surface to the circuit board insertion slot;
    a plurality of light emitting diodes (LEDs) each having a top and a bottom and being embedded in a respective installation hole, a plurality of first contact points being disposed on the bottom towards the circuit board insertion slot of the heat dissipation body, the first contact points being resilient and electrically conductive structures, at least one portion of peripheral surfaces of each of said LEDs being an inclined face, walls of said installation holes corresponding to the inclined faces of the LEDs to be oblique; and
    a circuit board received in the circuit board insertion slot, a plurality of second contact points disposed on an upper face of the circuit board and corresponding to the first contact points of said LEDs whereby the second contact points electrically connect respective first contact points, the circuit board being received in the rabbets of the circuit board insertion slot in a transverse direction of the heat dissipation body, and the resilient and electrically conductive structures of the LEDs tightly pressing and fixing the circuit board in the rabbets by applying a force onto the circuit board,
    wherein the peripheral surfaces of said LEDs are tightly fitted to said installation holes of the heat dissipation body so that heat generated by said LEDs is directly and laterally dissipated by the heat dissipation body.

2. The LED light bar structure having heat dissipation function as claimed in claim 1, characterized in that: the plurality of first contact points of said LEDs are resilient metal sheets.

3. The LED light bar structure having heat dissipation function as claimed in claim 1, characterized in that: the heat dissipation body is a heat dissipation frame bar made of metal or alloy.

4. The LED light bar structure having heat dissipation function as claimed in claim 1, characterized in that: the drawer-like slot has a substantially-T-shaped cross section.

* * * * *